United States Patent [19]

Sugiura

[11] 4,415,908

[45] Nov. 15, 1983

[54] THERMAL PRINTER

[75] Inventor: Kenitiro Sugiura, Funabashi, Japan

[73] Assignee: Canon Kabushiki Kaisha, Tokyo, Japan

[21] Appl. No.: 394,790

[22] Filed: Jul. 2, 1982

Related U.S. Application Data

[63] Continuation of Ser. No. 269,884, Jun. 3, 1981, abandoned.

[30] Foreign Application Priority Data

Jun. 13, 1980 [JP] Japan .................................. 55-78964

[51] Int. Cl.[3] .............................................. G01D 15/10

[52] U.S. Cl. ................................ 346/76 PH; 219/216

[58] Field of Search ................... 346/76 PH; 219/216; 400/120

[56] References Cited

U.S. PATENT DOCUMENTS 4,246,587 1/1981 Reilly et al. ............... 346/76 PH X 4,271,414 6/1981 Williams et al. ............... 346/76 PH 4,284,876 8/1981 Ishibashi et al. ........... 346/76 PH X 4,305,080 12/1981 Cunningham et al. ........ 346/76 PH

*Primary Examiner*—Joseph W. Hartary

*Attorney, Agent, or Firm*—Fitzpatrick, Cella, Harper & Scinto

[57] ABSTRACT

There is disclosed a thermal printer constructed with a thermal head having a plurality of heat generating sections to record a pattern on a recording sheet; a pattern memory to record pattern information for selectively driving said plurality of heat generating sections in said thermal head; an adjusting pattern device connected to the pattern memory to discriminate the pattern informations for selective driving of at least three adjacent heat generating sections out of the plurality of heat generating sections in the thermal head, and to generate adjusting pattern information which drives two heat generating sections out of the three heat generating sections; and a feeding device connected to the pattern memory and the adjusting pattern device, to feed the pattern information stored in the pattern memory and the adjusting pattern information to the thermal head.

10 Claims, 4 Drawing Figures

THERMAL PRINTER

This is a continuation, of application Ser. No. 269,884, filed June 3, 1981, now abandoned.

BACKGROUND OF THE INVENTION

1. Field of the Invention

This invention relates to a thermal printer, and, more particularly, it is concerned with an improvement in the thermal printer for better print quality.

2. Description of the Prior Art

It is a usual practice in the thermal printer for printing characters and letters that a thermal head having a vertical row of dots is first heated, and then the thermal head is moved sidewise, while printing. In view of such a printing operation under heat by the thermal head, there tend to occur differences in the running of the printed dots depending on heat generating time, temperature characteristic of the thermal head, paper quality, and so forth, hence it is difficult to maintain constant the size and density of the printed dots. Rather, the difference in density is prone to occur due to density of the printed dots. In order to avoid such a disadvantage, there has been made a correction or adjustment among the horizontal rows (cr rank) of dots relative to the lateral movement of the thermal head.

Of recent, the number of dots in a character tend to increase (e.g., 24×24 dots per character) due to printing of complicated character patterns such as chinese characters and so on. With such an increase in the number of dots in one character, the distance among the dots constituting the character becomes shorter. A consequence of which it has become more and more difficult to improve the printed quality of the character without a density adjustment in not only the horizontal row (rank) but also the vertical row (file).

SUMMARY OF THE INVENTION

It is therefore an object of the present invention to provide a thermal printer free from the above-mentioned disadvantages, which is realized by carrying out adjustment of the dots in the vertical row.

It is another object of the present invention to provide a thermal printer of an improved construction provided with a thermal head having a printing position of at least n numbers of dots in the vertical row, wherein comparison is first made relative to the mutually adjacent dot positions in the vertical row dot pattern data to be printed. Then a heat generating signal for vertical row adjustment is generated at least once for one vertical row dot pattern data to adjust the density difference in the vertical row, and, in addition to an ordinary heat generating signal, the above-mentioned vertical row adjusting heat generating signal is applied to the thermal head at least once, thereby performing the printing of one vertical row for the above-mentioned vertical row dot pattern data.

It is still another object of the present invention to provide a thermal printer, wherein comparison is first made between the above-mentioned vertical row dot pattern data and the preceding dot pattern data relative to the above-mentioned dot pattern data. Then a heat generating signal for horizontal row adjustment is generated at least once relative to the above-mentioned vertical row dot pattern data to adjust the density difference in the horizontal row. In addition to the above-mentioned heat generating signal for the vertical row adjustment, the above-mentioned heat generating signal for the horizontal row adjustment is applied to the thermal head at least once, thereby performing printing of one vertical row for the above-mentioned vertical row dot pattern data.

It is yet another object of the present invention to provide a thermal printer, wherein the above-mentioned ordinary heat generating signal, heat generating signal for the vertical row adjustment, and heat generating signal for the horizontal row adjustment; are applied to the thermal head with a certain time lag or delay.

It is another object of the present invention to provide a thermal printer, wherein one-dot pattern is divided into three patterns of basic, vertical row (file) adjustment, and horizontal row (rank) adjustment patterns, then heat is generated in the thermal head for each pattern, and the three patterns are superposed one after the other for one dot to adjust the printing position, thereby improving the printed quality of a character.

DESCRIPTION OF THE PREFERRED EMBODIMENTS

In the following, the present invention will be described in detail in reference to the accompanying drawing.

Figure 1:
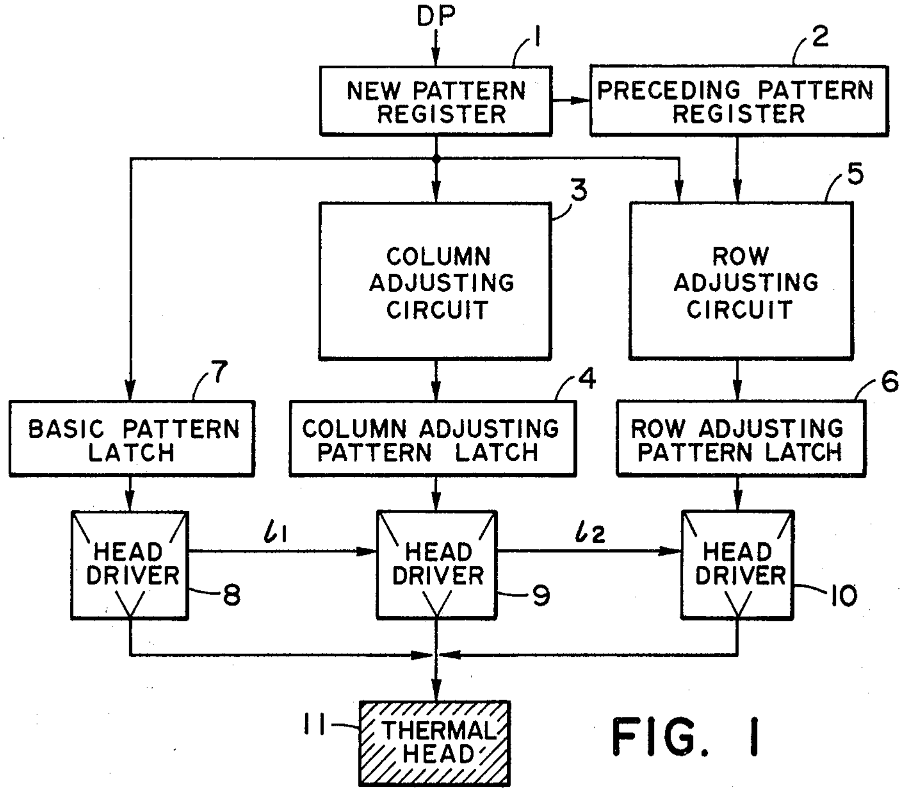
FIG. 1 is a block diagram showing one embodiment of the thermal printer according to the present invention.
Figure 2:
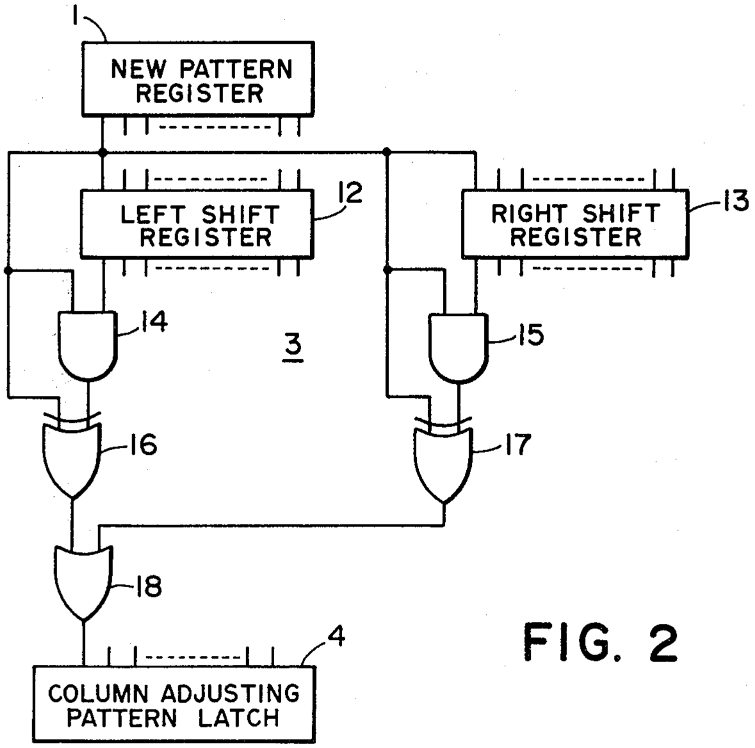
FIG. 2 is a block diagram showing the details of the vertical row adjusting circuit shown in FIG. 1.
Figure 3:
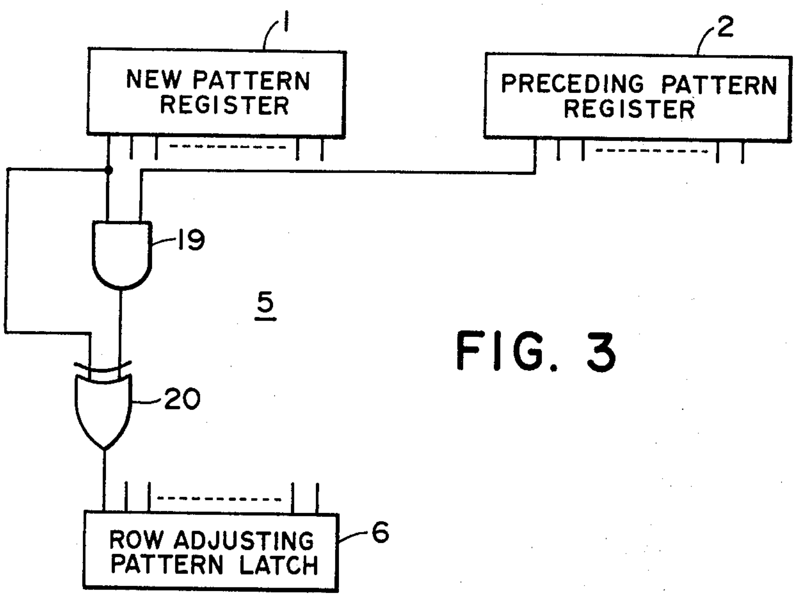
FIG. 3 is also a block diagram showing details of the horizontal row adjusting circuit shown in FIG. 1.

FIGS. 1, 2 and 3 indicate one preferred embodiment of the present invention. In FIG. 1, a reference numeral 1 designates a new pattern register to store therein input dot pattern data DP. A reference numeral 2 designates a preceding pattern register to store therein the dot pattern which was previously introduced as an input into the new pattern register 1. Reference numeral 3 refers to a vertical row (file) adjusting circuit to produce an output vertical row adjusting pattern when the new dot pattern stored in the new pattern register 1 is supplied thereto. Reference numeral 4 refers to a vertical row adjusting pattern latch to store therein the vertical row adjusting pattern. Reference numerical 5 designates a horizontal row (rank) adjusting circuit to produce an output horizontal row adjusting pattern when the new dot pattern and the preceding dot pattern, which have been read out respectively from the new pattern register 1 and the previous pattern resister 2, are supplied thereto. Reference numeral 6 refers to a horizontal row adjusting pattern latch to store therein the horizontal row adjusting pattern. Reference numeral 7 designates a basic pattern latch, in which the content as supplied from the new pattern register 1 is latched.

As soon as the new dot pattern data DP is introduced into the new pattern register 1 as an input, the vertical row adjusting pattern, the horizontal row adjusting pattern, and the basic pattern are latched in the respective latches 4, 6 and 7 through the vertical row adjusting circuit 3, the horizontal row adjusting circuit 5, and the new pattern register 1, afterwards the these patterns are respectively forwarded to corresponding head drivers 9, 10 and 8. Each of the head drivers 8, 9 and 10 heats the thermal head 11 with a predetermined time lag in accordance with the input dot pattern. The sequence of heating is controlled by signal lines $l_1$ and $l_2$, thereby generating heat in the order of the head drivers 8, 9 and 10. The heat generating time for each of the head drivers 8, 9 and 10 is predetermined appropriately in consideration of the characteristics of the thermal head, quality of paper, etc.

The modes of adjustment of the printing position according to the present invention will be described in further details hereinbelow.

In one vertical row of dots in the thermal printer, as the space intervals among the dots arranged in the vertical row are rather short as mentioned in the foregoing, there tends to emerge running of ink among the closely adjacent dots as printed. Considering this point, the vertical row adjustment according to the present invention is performed in such a manner that, when no dot exists in the basic pattern, i.e., when no dot printing is done at the dot position, no adjustment is effected at that dot position, leaving the same blank. While a dot exists in the basic pattern, judgement is made as to whether any dots are present at the adjacent positions above and below the dot, or not. When there is a dot at either the upper or the lower position thereof, the dot printing is effected as the vertical row adjustment, and, when the dots exist at both upper and lower positions, no dot printing for the adjustment is effected to avoid running of the dot due to the superposed printing. In the lateral movement of the vertical row of the dots, the thermal head is heated with respect to the preceding dot pattern, while heating of the head with respect to the current dot pattern is effected before the head heated for the preceding dot pattern is completely cooled. As the result of this, when the superposed printing is effected to carry out the horizontal row adjustment when the dots also exist even in the current pattern, at the place where the dots existed in the preceding pattern, the density of the dots printed at the position becomes excessively high. To avoid this, when the horizontal row adjustment is to be done, the dot patterns in both preceding and current patterns are compared, and, if dots are present in both patterns at the same position, no horizontal adjustment is effected. The dot printing is done at the horizontal row adjustment only when no dot exists in the preceding dot pattern, and even if dots are present in the preceding dot pattern, no horizontal adjustment is conducted at the position where no dot is present in the current pattern, leaving the same blank.

Thus, the present invention contemplates improvement in the quality of the printed characters by first dividing the dot pattern to be printed into the vertical row, horizontal row, and the basic patterns, and then combining the heat generating time with each pattern.

In the following, detailed explanations will be given as the vertical and horizontal row adjusting circuits in reference to FIGS. 2 and 3.

The vertical row adjusting circuit 3 is constructed, for example, with a left shift register 12, a right shift register 13, logic sum gates 14, 15, exclusive logic sum gates 16, 17, and a logic sum gate 18, as shown in FIG. 2. An output from the new pattern register 1 is supplied to the shift registers 12, 13 and the gates 14, 15, 16 and 17. An output from the logic sum gate 18 is supplied to the vertical row adjusting pattern latch 4. It is to be noted here that the gates 14 to 18 as shown in FIG. 2 are disposed for each bit in the registers 1, 12 and 13, although, for the sake of simplicity, only one bit is shown in FIG. 3. When a new dot pattern input is introduced into the new pattern register 1, the new dot pattern is shifted by one bit in the leftward direction by the left shift register 12. A logic product of the result of the left shifting and the content of the new pattern register 1 is taken in the gate 14, and an exclusive logic sum of the result obtained in the gate 14 and the content of the new pattern register 1 is taken in the gate 16, whereby comparison is made between the content of each dot position. Further the content of the dot position one dot above the same, and an output "1" is obtained from the gate 16, only when the content of the dot position in the new dot pattern is "1", and the content of the dot position one dot above the same dot position is "0". In the same manner, the new dot pattern is shifted by one bit in the rightward direction by the right shift register 13, the logic product of the result of the rightward shifting and the content of the new pattern register 1 is taken in the gate 15, and the exclusive logic sum of the result obtained in the gate 15 and the content of the new pattern register 1 is taken in the gate 17. In this manner, comparison is made between the content of each dot position and the content of the dot position one dot below the same, whereby an output "1" is obtained from the gate 17, only when the content of the dot position in the new dot pattern is "1" and the content of the dot position one dot below the same dot position is "0". By taking the logic sum of the outputs from the gates 16 and 17 in the gate 18, an adjusting output "1" is obtained, only when the content of a certain dot position is "1" and a content of the adjacent dot position either above or below thereof is "1", while a vertical row adjusting pattern as an adjusting output "0" is obtained in other state, i.e., when the content of the dot position is "0" and the content of the adjacent dot position either above or below the dot is "1". This vertical row adjusting pattern is stored in the latch 4.

FIG. 3 illustrates a concrete embodiment of the horizontal adjusting circuit 5. The circuit is constructed with a logic product gate 19 and an exclusive logic sum gate 20, provided in each bit of the registers 1 and 2. In other words, when new dot pattern input is introduced into the new pattern register 1, a logic product of the content of the new pattern register 1 and the content of the preceding pattern register 2 are taken in the gate 19, and an exclusive logic sum of the result obtained in the gate 19 and the content of the new pattern register 1 is taken in the gate 20. In this manner, comparison is made between the preceding and current dot patterns, and based on the comparison an adjusting output "1" is produced, only when the content of the dot position in the new dot pattern is "1" and the content of the corresponding dot position in the preceding dot pattern is "0". While an adjusting output "0" is produced in other state, i.e., when the content of the dot position in the new dot pattern is "0" or the content of the corresponding position in the preceding dot pattern is "1", even if the content of the dot position in the new dot pattern is "1". The result obtained from the gate 20 constitutes the horizontal row adjusting pattern which is stored in the latch 6.

Figure 4:
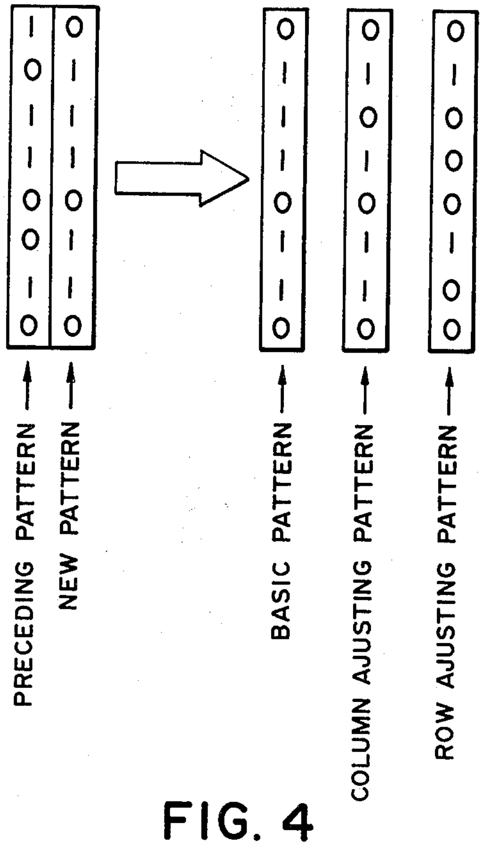
FIG. 4 is diagram showing one example of the dot adjusting pattern according to the present invention.

FIG. 4 shows one example of the basic pattern, the vertical row adjusting pattern, and the horizontal row adjusting pattern formed in the above-described manner in accordance with the present invention. The three patterns obtained according to the present invention are printed in superposition on one and the same position for three times in the order of the basic pattern, the vertical adjusting pattern, and the horizontal row adjusting pattern.

As stated in the foregoing, the thermal printer according to the present invention performs the density adjustment in both vertical and horizontal rows at the time of the thermal printing, which makes it possible to effect the optimum adjustment in conformity to the head characteristic and the paper quality, hence remarkable improvement can be attained in the quality of the printed character.

What I claim is:

1. Thermal printer comprising:

(a) a thermal head having a plurality of heat generating sections to record a pattern on a recording sheet;

(b) a pattern memory for recording pattern information to selectively drive said plurality of heat generating sections in said thermal head;

(c) adjusting means connected to said pattern memory, to discriminate said pattern informations for selectively driving at least three adjacent heat generating sections out of said plurality of heat generating sections in said thermal head, and to generate adjusting pattern information which drive two heat generating sections out of said three heat generating sections; and (d) means connected to said memory and said adjusting pattern means for supplying said pattern information stored in said pattern memory and said adjusting pattern informations to said thermal head.

2. Thermal printer as set forth in claim 1, wherein said supplying means supplies to said thermal head said adjusting pattern information of said pattern memory and said adjusting information of said adjusting pattern means with a separate timing.

3. Thermal printer as set forth in claim 1, wherein said adjusting pattern means includes a first memory for storing therein said pattern information as memorized in said pattern memory in the form of its having been shifted rightward by one bit, and a second memory for storing therein said pattern information of said pattern memory in the form of its having been shifted leftward by one bit.

4. Thermal printer as set forth in claim 1, wherein said thermal head has a plurality of heat generating sections arranged in one line.

5. Thermal printer comprising:

a thermal head having a printing part of at least n numbers of dots in a row;

adjusting means for driving said thermal head and for generating a heat generating signal for row adjustment, at least once, to adjust a density difference in the row in accordance with row dot pattern data to be printed; and supplying means for supplying to said thermal said heat generating signal for row adjustment and the row dot pattern data to said thermal head.

6. Thermal printer as set forth in claim 5, wherein said supplying means further comprises means for applying at separate times said heat generating signal for row adjustment and the row dot pattern data.

7. Thermal printer as set forth in claim 5, further comprising:

row adjustment means for generating a heat generating signal for row adjustment, at least once, relative to the row dot pattern data to adjust the density difference in adjacent rows upon comparison of the row dot pattern data with the preceding row dot pattern data, and in addition to said heat generating signal for row adjustment; and means for applying said heat generating signal for adjacent row adjustment to said thermal head, at least once.

8. Thermal printer as set forth in claim 5, wherein said adjusting means comprises means for detecting the dot pattern density in the row dot pattern data.

9. Thermal printer as set forth in claim 8, further comprising:

row adjustment means for generating heat generating signal for adjacent row adjustment, at least once, relative to the row dot pattern data to adjust the density difference in adjacent rows upon comparison of the row dot pattern data with the preceding row dot pattern data, and in addition to said heat generating signal for row adjustment; and means for applying said heat generating signal for adjacent row adjustment at least once to said thermal head.

10. Thermal printer comprising:

a thermal head having a printing part of at least n numbers of dots in a row;

adjusting means for driving said thermal head and for generating a heat generating signal for adjustment in accordance with a dot driving distribution of the printing part of said n members of dots upon driving of said thermal head in accordance with one row dot pattern data to be printed; and applying means for applying said row dot pattern data and said heat generating signal for adjustment to said thermal head.

* * * * *

UNITED STATES PATENT AND TRADEMARK OFFICE

CERTIFICATE OF CORRECTION

PATENT NO. : 4,415,908

DATED : November 15, 1983

INVENTOR(S) : KENITIRO SUGIURA

It is certified that error appears in the above-identified patent and that said Letters Patent is hereby corrected as shown below:

Column 1, line 26, "cr" should read --or--.

Column 2, line 55, "resister" should read --register--;
line 67, delete "these".

Column 5, line 21 (Claim 1), "informations" should read --information--;
line 25 (Claim 1), "drive" should read --drives--;
line 28 (Claim 1), before "memory" insert --pattern--;
line 29 (Claim 1), before "means" delete --pattern--;
line 31 (Claim 1), "informations" should read --information--.

Column 6, line 6 (Claim 5), "thermal" should read --head--.

Signed and Sealed this

*Seventh* Day of *August 1984*

[SEAL]

*Attest:*

GERALD J. MOSSINGHOFF

*Attesting Officer* — *Commissioner of Patents and Trademarks*